(No Model.) 3 Sheets—Sheet 1.
J. A. HOFF.
AUTOMATIC FLUID PRESSURE BRAKE MECHANISM.
No. 495,088. Patented Apr. 11, 1893.
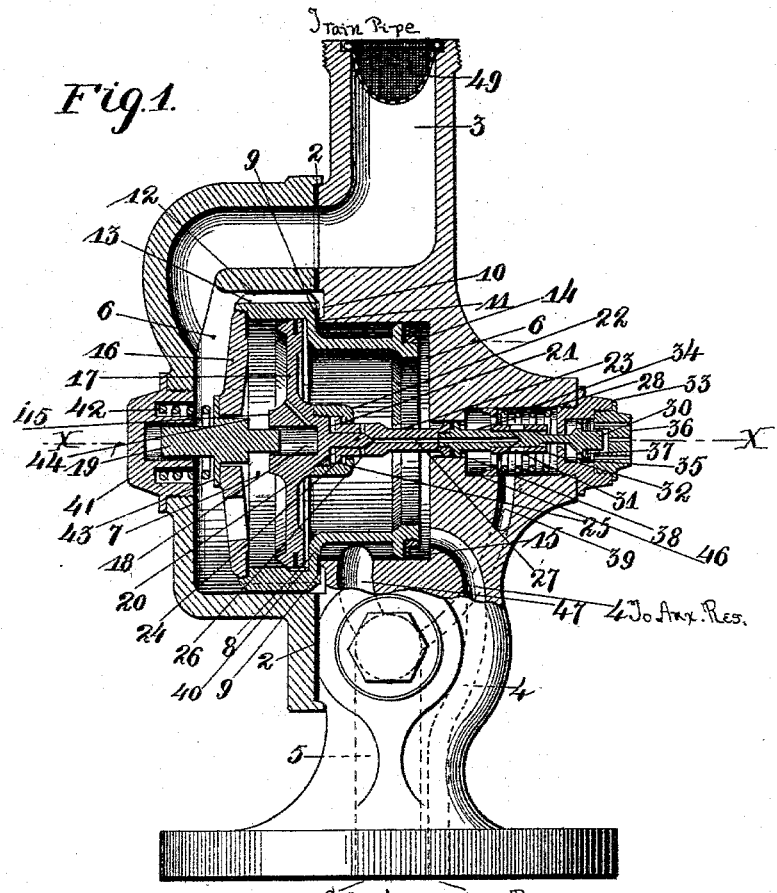
Witnesses
Frank Lansberg
J. J. Smith
Inventor
John A. Hoff
By his Attorneys
Keller & Starek (No Model.) 3 Sheets—Sheet 2.
J. A. HOFF.
AUTOMATIC FLUID PRESSURE BRAKE MECHANISM.
No. 495,088. Patented Apr. 11, 1893.
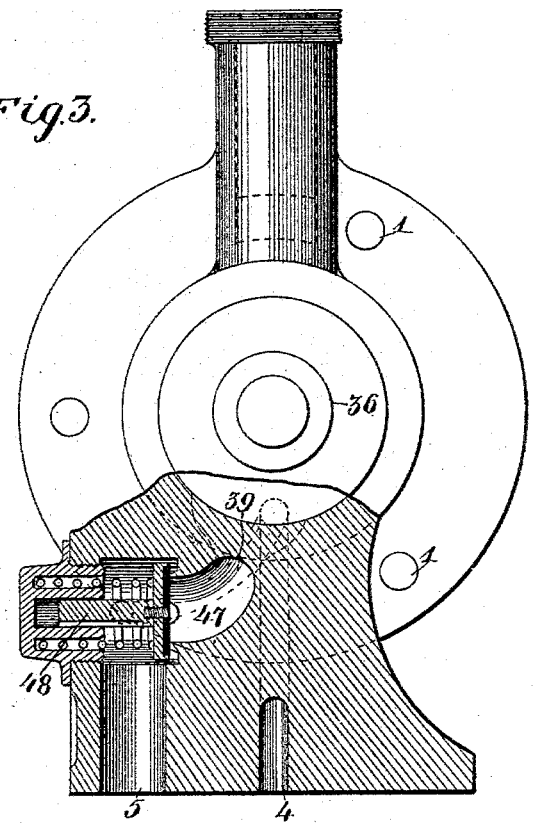
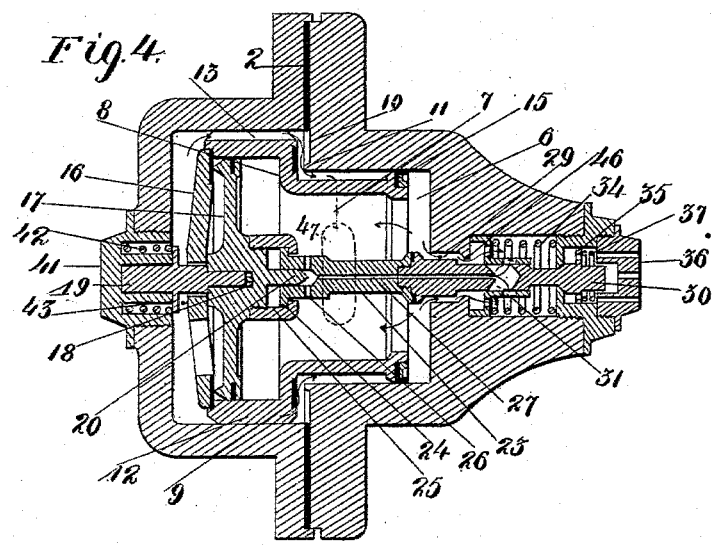
Witnesses
Frank Lansberg
S. T. Smith
Inventor
John A. Hoff.
By his Attorneys
Keller & Starek

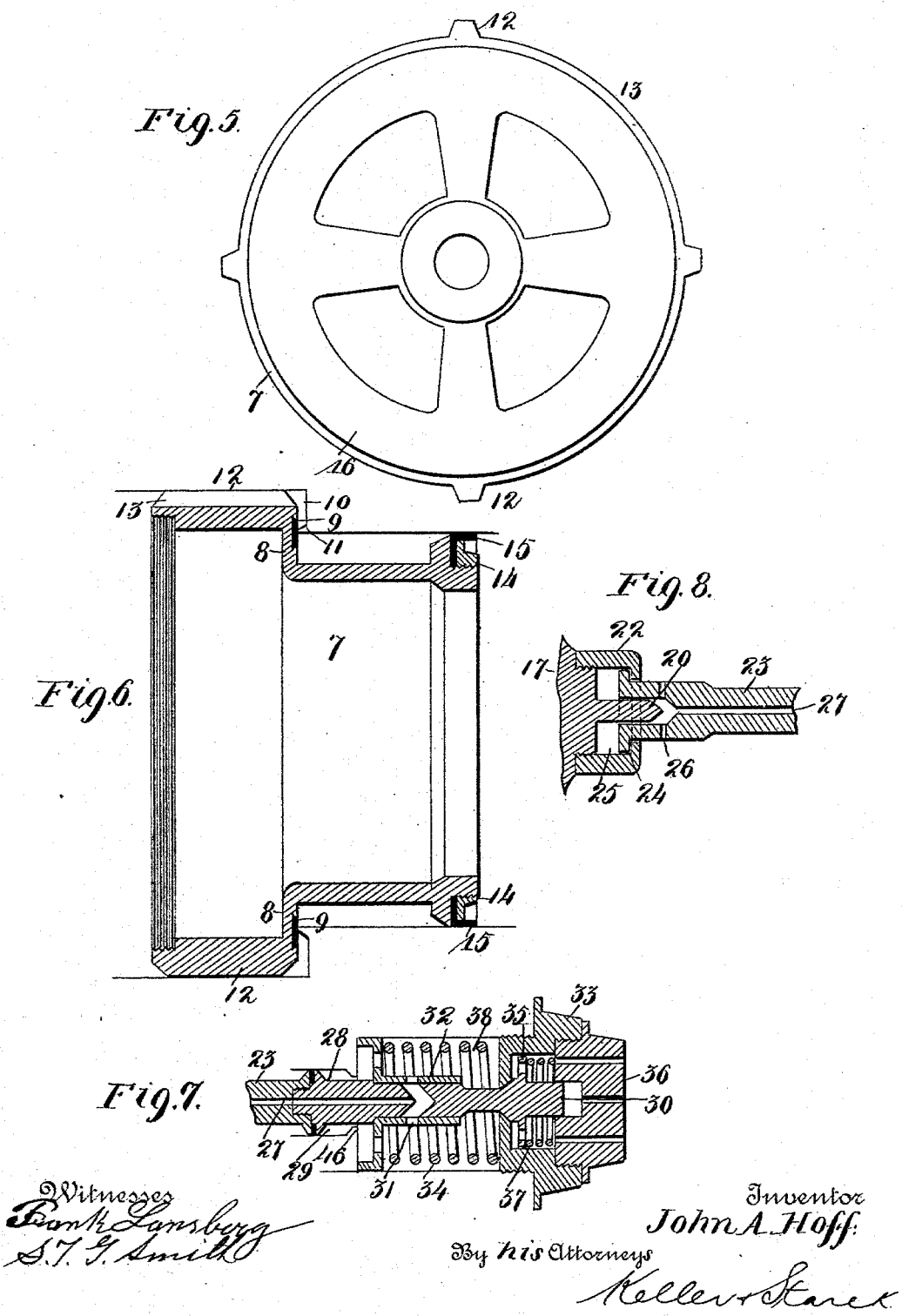

UNITED STATES PATENT OFFICE.

JOHN A. HOFF, OF ST. LOUIS, MISSOURI, ASSIGNOR TO THE LANSBERG BRAKE COMPANY, OF SAME PLACE.

AUTOMATIC FLUID-PRESSURE-BRAKE MECHANISM.

SPECIFICATION forming part of Letters Patent No. 495,088, dated April 11, 1893.

Application filed October 22, 1892. Serial No. 449,584. (No model.)

*To all whom it may concern:*

Be it known that I, JOHN A. HOFF, of the city of St. Louis, State of Missouri, have invented certain new and useful Improvements in Automatic Fluid-Pressure-Brake Mechanisms, of which the following is a full, clear, and exact description, reference being had to the accompanying drawings, forming a part hereof.

My invention relates to improvements in fluid pressure brake mechanisms and it consists in the novel arrangement and combination of parts more particularly described in the specification and set out in the claims.

In the drawings Figure 1 is a vertical longitudinal section of my complete invention, partly in elevation, showing the graduating piston in feeding position. Fig. 2 is a transverse section taken on the line $x$—$x$ of Fig. 1, showing the graduating piston in position for application of brakes for service stops. Fig. 3 is an end view of the same, one-half in section showing the check valve for preventing back pressure from the brake-cylinder into the train pipe. Fig. 4 is a transverse section taken also on the line $x$—$x$ of Fig. 1 showing the graduating piston in emergency position. Fig. 5 is a top plan view of the cap attached to one end of the cylindrical emergency valve. Fig. 6 is an enlarged vertical section of the cylindrical emergency valve with cap removed. Fig. 7 is an enlarged sectional view of the exhaust valve and parts co-operating with it, and Fig. 8 is an enlarged sectional view of the graduating valve and adjoining parts.

The present invention has relation to automatic fluid-pressure brake mechanisms wherein air is admitted from an auxiliary reservoir into the brake cylinder for application of brakes in service stops, and wherein, train pipe pressure in combination with auxiliary reservoir pressure is employed to apply the brakes in emergency cases; and it has for its object to (first) reduce to a minimum the friction of the various parts usually accompanying their action, (second) to make the piston or valve portion thereof responsive to the slightest variation of pressure in the train pipe as controlled by the engineer, (third) to reduce to a minimum the weight of those parts of the valve by which the brake mechanism is controlled, and (fourth) to improve other details of construction as more particularly described and referred to in the specification.

The same figures of reference indicate the same parts throughout the several views.

The mechanism is composed of a suitable sectional casing held together by bolts 1, as seen in Figs. 2 and 3, ordinary packing 2 being interposed between the sections. Leading from the casing are passages 3 communicating with the train pipe, 4, communicating with the auxiliary reservoir (not shown), and 5, leading to the brake cylinder (not shown.) The casing has a main valve-chamber 6 within which the principal parts constituting my invention operate. Adjacent to the walls of the valve-chamber, but at a suitable distance therefrom is the cylindrical emergency valve 7 having a shoulder or flanged part 8 near its middle portion. Said shoulder is provided with a suitable packing 9 extending around the cylinder. Adjacent to the packing 9, on the casing, is an annular seat 10 provided with an annular lip 11 against which the packing 9 comes in contact, making a tight joint. The emergency valve has formed on the exterior thereof, a suitable number of ribs 12 for guiding the cylinder in its movements, and leaving a passage 13 between the casing and the exterior of the cylinder for the circulation of air from the train pipe as hereinafter described. The right hand portion of the cylinder has attached thereto a screw-threaded collar 14 by which is secured to the cylinder a suitable packing 15 forming a joint between the cylinder and the casing, and performing its usual well known function. The limit of movement of the emergency valve in one direction is of course determined by the lip 11 on the seat 10, which lip comes in contact with the packing 9 on said cylinder. To the left end of the emergency valve is secured by screwing a ribbed cap 16, a suitable gasket or packing being likewise interposed between the same and the valve casing. The cap has a central opening for the passage of a suitable stem to be subsequently referred to.

Within the emergency valve and to the left of the shoulder 8 is a graduating piston 17 with suitable packing as shown, having a central cylindrical cavity or depression 18 within which slides one end of the decreased portion of the stem 19 acting as a guide for the piston, and passing through the ribbed cap 16, and to be subsequently more particularly described. Projecting from the graduating piston and at a suitable distance from the cavity 18 is a graduating valve 20. Said valve projects from a shoulder 21, the shoulder being screw-threaded; and to said screw-threaded portion is screwed a cylindrical cap 22 having a smooth interior bore to the right of the shoulder for the reception of the stem 23 which slides within said cap. The stem 23 has a circular or annular flange 24 bearing against the circular interior rim 25 of the cap 22, (see Fig. 8) its lateral movement to the right being limited by said rim. One end of the stem 23 has a central cylindrical opening within which the graduating valve 20 is free to move. Said graduating valve has a conical end which serves to open and close the lateral ports 26 of the stem 23 and also the central passage 27, the said valve also determining the limit of movement of the graduating piston in one direction. By referring to Fig. 1 which shows these ports and the central passage closed it will be seen that the graduating piston and the graduating valve can be moved independently of the stem 23, and to an extent sufficient to open the lateral ports 26 and passage 27, after which the lateral flange of the stem comes in contact with the rim 25 of the cap, and the stem moves along with the graduating valve 20. It will thus be seen that the graduating piston and valve have a movement independent of and slightly in advance of the stem 23. To one end of the stem 23 is secured a piston valve 28, the parts at the union being enlarged over the diameter of the valve stem, and suitable packing being interposed as shown. The parts operate within a circular opening in the casting, and an annular space 29 is left between the walls of said opening and the stem to afford a passage for the circulation of air (see Fig. 2). The casting at one end of said annular space affords a seat for the enlarged end of the piston valve and limits its movement in one direction. The piston valve 28 has a central passage forming a continuation of the passage 27 of the stem and has also a conical end, said end abutting against the conical seat of the exhaust valve 30 and serving also to open the lateral openings or ports 31 of the sleeve 32 which loosely embraces the adjacent ends of the piston valve and the exhaust valve, making a joint at that place. The left hand end of the sleeve is provided with a circular perforated flange and between this flange and the cap seat 33 operates a spring 34 which spring serves to balance any air pressure exerted upon that portion of the surface of the piston valve 28 within the annular space 29, and allow the graduating valve to graduate freely and without friction.

The exhaust valve has a lateral perforated flange 35 operating within the cap constituting the valve seat, and between said flange and the exhaust cap 36 is a spring 37 for controlling the movement of the exhaust valve. The exhaust cap 36 has suitable exhaust ports as shown in the drawings. The cylindrical opening within which the sleeve 32 and the spring 34 operate constitutes an enlarged chamber 38 with which communicates the passage 39 leading to passage 5 which latter communicates with the brake cylinder. To the left of the shoulder 8 of the emergency valve is a groove or port 40 for the passage of air.

As hereinbefore stated, the ribbed cap 16 has a central opening through which passes a stem 19 freely moving therein. The right hand portion of the stem plays in a cylindrical cavity 18 of the graduating piston and the left hand portion of the stem plays within a cap piece 41 secured to the casing. The stem is guided and controlled by a spring 42 which fits in an annular groove formed in the cap, and bears against a flange 43 of the stem on top of the ribbed cap 16. The ribbed cap is slightly conical, the bottom of the central opening being slightly above a plane passing through the annular packing along the left hand edge of the emergency valve. Immediately to the right of the central opening of the ribbed cap, the stem 19 expands into a shoulder 44 against which abuts in its lateral movement the hub portion 45 of the graduating piston. By referring to Fig. 2 it will be seen that the hub 45 will strike the shoulder 44 of the stem in its lateral movement, before the outer rim of the graduating piston abuts against the ribbed cap, and that the stem 19 must first be moved slightly in advance before the graduating piston and cap come in contact.

The operation of the device can be described with reference to three conditions. In the first place let us assume that the auxiliary reservoir is empty. Air is admitted from the main reservoir (not shown) into the train pipe and travels through passage 3 into the main valve chamber forcing the graduating piston to feeding position (shown in Fig. 1). The emergency valve rests on its packing on the lip 11 as seen in Fig. 1 this being the normal position of said valve. It is moreover aided in assuming this position by the usual excess of air pressure on the left or top thereof, said excess being the pressure per square inch of surface multiplied by the area of the annular lip 11 on which the shoulder of the valve rests. As the graduating piston is forced to feeding position the piston valve 28 is forced to its seat, forcing exhaust valve 30 from its seat, closing ports 31 of the sleeve 32 and allowing the brake cylinder to exhaust via passage 39 through the ports of the exhaust cap 36. The graduating piston being forced to feeding position, direct communication is established between the train pipe and the auxiliary reservoir through passage 4, main valve chamber 6 the interior of the emergency valve, port 40 and passage 3. The second condition contemplates a gradual reduction of air pressure within the train pipe for application of brakes in ordinary service stops. The train pipe pressure is gradually reduced (say five pounds) on top of the graduating piston 17; the pressure from below raises the said piston, closing port or groove 40, moving to the left the graduating valve 20, opening ports 26, the air within the main valve-chamber which comes from the auxiliary reservoir by passage 4 passing into the central passage 27. This preliminary reduction of train pipe pressure results in the immediate movement or raising of the graduating piston, the latter being responsive to the slightest differences of train pressure, on account of the lightness of the piston, and the little friction the same has to overcome; and further because the said piston having an independent movement slightly in advance of the stem 23 and piston valve 28, it has nothing to carry in its initial operation except its own weight. A further reduction of air pressure within the train pipe causes the graduating piston to carry the piston valve 28 off its seat, allowing the exhaust valve 30 to seat itself, the spring 37 closing communication of the brake cylinder with the open air. The piston valve 28 continues in its lateral movement until the flange of the sleeve 32 strikes the shoulder or abutment 46 formed in that part of the casing within which said sleeve works. The air then passes through ports 31 of the sleeve into passage 39 leading to the brake cylinder, and the brakes are applied gradually. This condition of things obtains so long as train pipe pressure is slightly reduced below auxiliary reservoir pressure. When however the pressure within the auxiliary reservoir falls slightly below train pipe pressure owing to exhaustion consequent upon brake application, then the slight excess of air pressure from the train pipe again seats the graduating valve 20, closing ports 26 leading to the central passage 27 of the stem 23. The spring 34 now acts to keep the piston valve 28 and the stem 23 stationary, said spring balancing any unbalanced pressure on piston valve 28, and allowing the graduating piston to graduate freely, and without friction. The train pipe pressure is further reduced and the action of the valve is repeated. The third and last condition contemplates a sudden reduction of air pressure within the train pipe for application of brakes in cases of emergency. The effect of such a sudden reduction would be a sudden rush of air from the auxiliary reservoir into the main valve chamber on the under surface of the graduating piston and suddenly thrust said piston to the left, causing the hub 45 thereof to strike the shoulder 44 of the stem 19, to laterally move said stem, and then the outer rim of the graduating piston strikes the packing on the ribbed cap 16 secured to the emergency valve. The momentum of the graduating piston will then move the emergency valve to which the ribbed cap is attached, off its seat or lip 11, the position of the parts being indicated in Fig. 4. Air from the train pipe will rush beneath the shoulder 8 of the emergency valve, and through the passage 47 via passage 5 enter the brake cylinder as indicated by the arrows. At the same time air from the auxiliary reservoir will take the same course as in ordinary cases of brake application also via passage or space 29, and passage 39 to the brake cylinder, the combined pressures serving to apply the brakes suddenly. The features of the stem 19 passing through the ribbed cap on top of the emergency valve and the hub 45 of the graduating piston operating against the shoulder 44 of said stem, are important. If the engineer should accidentally reduce the train pipe pressure to a limit approaching emergency reduction in ordinary occasions, but insufficient to cause emergency application, it will be apparent from the construction as shown and described, that the hub 45 will strike the shoulder 44 with a force sufficient to move the stem 19 against the spring 42, but insufficient to cause the outer rim of the graduating piston to strike the ribbed cap and raise the emergency valve off its seat. This arrangement also prevents the jarring of the emergency valve in cases of this sort.

The passage 47 carrying air from the train pipe direct to the brake cylinder leads to a check valve 48 (shown in Fig. 3) of any preferred construction under which the air entering the brake cylinder passes, said valve serving to prevent back pressure from the brake cylinder into the train pipe. The passage 39 of course leads to the brake cylinder on the opposite side of the valve as indicated in dotted lines in Fig. 3.

Screen 49 shown in Fig. 1 is a removable cup-shaped arrester for dust, &c., preventing accumulation of the same within the valve chamber. The edges of said cup rest in an annular groove within the entrance of passage 3 leading to the train pipe.

The term "cylindrical emergency valve" in the present application is applied to the cylinder within the main valve-chamber, which responds to or is operated by the graduating piston upon, a sudden reduction of air pressure within the train pipe in cases of emergency.

Having fully described my invention, what I claim is—

1. An automatic fluid-pressure brake mechanism having a suitable casing, a main valve-chamber within said casing, and a movable cylindrical emergency valve within said chamber, and operating only upon a sudden reduction of air pressure within the train pipe, substantially as set forth.

2. An automatic fluid-pressure brake mechanism having a suitable casing, a main valve-chamber within said casing, a movable cylindrical emergency valve within said chamber and operative only upon a sudden reduction of air pressure within the train pipe, and a graduating piston and valve within the emergency valve operative under any reduction of air pressure within the train pipe, said piston and valve serving to control the air operating the brake cylinder, substantially as set forth.

3. An automatic fluid-pressure brake mechanism having a suitable casing, a main valve-chamber within said casing, a movable cylindrical emergency valve in said chamber, a piston provided with a suitable graduating valve and located in the emergency valve, a valve-controlled hollow stem secured to said piston, the said piston and graduating valve having a movement independent of and slightly in advance of the stem, substantially as set forth.

4. An automatic fluid-pressure brake mechanism having a sectional casing, a main valve chamber in said casing, a movable cylindrical emergency valve having a port or groove on the interior surface thereof, a graduating piston within the emergency valve and co-operating with said port or groove, a passage leading from the auxiliary reservoir to main valve chamber, suitable connections between the main valve chamber and brake cylinder, and means attached to the graduating piston for controlling admission of air from main valve chamber to the brake cylinder, substantially as set forth.

5. An automatic fluid-pressure brake mechanism having a main valve chamber, an emergency valve provided with a suitable port or groove on the interior surface thereof, a graduating piston within the emergency valve and co-operating with said port, a graduating valve projecting from said piston, a movable stem connected to the graduating valve and having lateral ports and a central passage co-operating with the graduating valve, and establishing communication between the valve chamber and brake cylinder respectively, the graduating piston and graduating valve having a movement in advance of the said stem, substantially as set forth.

6. In an automatic fluid-pressure brake mechanism, a graduating piston provided with a graduating valve, a screw-threaded shoulder surrounding said valve, a cylindrical cap having a smooth interior bore or passage secured to said shoulder, an interior circular rim at the outer end of the cap, a hollow stem surrounding the graduating valve and moving within the smooth bore of the cap, said stem having an exterior annular flange bearing against the said rim, and limiting the movement of the stem, the graduating piston and valve having a slight advance movement over the stem, substantially as set forth.

7. In an automatic fluid-pressure brake mechanism having a main valve-chamber, a centrally perforated stem, and means for controlling communication between said stem and the said valve chamber, a piston valve secured to said stem and having a central passage communicating with the central passage of the stem, an annular space being formed between the stem and the walls of the casing within which they move, an exhaust valve forming a seat for the piston valve, a sleeve having a perforated flange, and embracing the adjacent ends of the exhaust and piston valves, a cap seat secured to the casing and forming a seat for the exhaust valve, a spring located between said cap seat and the flange of the sleeve, an expanded chamber within which said sleeve and spring operate, and having a shoulder at one end for limiting the movement of the flange, ports located in the sleeve adjacent to the exhaust valve, said ports communicating with the central passage of the piston valve and stem, and the chamber with the brake cylinder, a cap piece with exhaust ports secured to the cap seat of the exhaust valve, a perforated flange embracing the exhaust valve and operated by a spring interposed in a chamber between the cap piece and flange, substantially as set forth.

8. In an automatic fluid-pressure brake mechanism having a main valve chamber, an emergency valve in said chamber provided with a shoulder, an annular space between the walls of the casing and the exterior of the valve, an annular seat provided with a lip forming a seat for the shoulder of the valve when in its normal position, a passage leading to the brake cylinder communicating with the said annular space, a passage leading to the main valve-chamber from the auxiliary reservoir, a passage leading from the valve chamber to train pipe, and means for operating the emergency valve, substantially as set forth.

9. In an automatic fluid-pressure brake mechanism having a main valve-chamber, an emergency valve within said chamber, provided with a ribbed cap at one end thereof, said cap having a central opening, a movable stem within said opening, a graduating piston within said valve co-operating with the stem, and a port or groove on the interior surface of the cylinder controlled by said piston, substantially as set forth.

10. In an automatic fluid-pressure brake mechanism having a main valve-chamber, an emergency valve provided with a cap at one end thereof, said cap having a central opening, a stem passing through said opening, a flange on said stem exterior to the cap for limiting the movement of the stem in one direction, means for normally retaining the stem against the cap, and a graduating piston within the emergency valve for displacing said stem, substantially as set forth.

11. In an automatic fluid-pressure brake mechanism having a main valve chamber, an emergency valve having a ribbed cap secured to one end thereof, a central opening in said cap, a stem passing through said opening, a flange on said stem exterior to the cap for limiting the movement of the stem in one direction, a cap piece secured to the casing and having a depression for receiving one end of the stem, a spring inserted between the cap piece and the flange of the stem for restoring the latter to its normal position, a shoulder on the stem interior to the cap ribbed, a graduating piston having an exterior circular rim and movably confined within the valve, and a hub piece on the piston co-operating with the shoulder of the stem for displacing the latter, the rim of the piston abutting against the ribbed cap of the valve, substantially as set forth.

12. In an automatic fluid-pressure brake mechanism, a casing having a main valve-chamber, an emergency valve within said chamber, a graduating piston located within said valve, and moving independently thereof, and an exhaust valve within the casing adapted to be directly operated by the movement of the graduating piston, substantially as set forth.

13. In an automatic fluid-pressure brake mechanism, a casing having a main valve-chamber, an emergency valve within said chamber, a graduating piston located within said valve and moving independently thereof, a graduating valve on said piston, a perforated stem secured to the piston and co-operating with the graduating valve, a piston valve attached to the stem, and an exhaust valve within the casing adapted to be operated by the movement communicated to said piston valve, substantially as set forth.

In testimony whereof I affix my signature in presence of two witnesses.

JOHN A. HOFF.

Witnesses:
   EMIL STAREK,
   C. F. KEELER.